United States Patent
Sexton et al.

(10) Patent No.: US 7,073,489 B2
(45) Date of Patent: Jul. 11, 2006

(54) APPARATUS AND METHOD FOR CONTROLLING THE TEMPERATURE OF THE LIQUID PETROLEUM GAS (LPG) FUEL

(76) Inventors: Barrington Sexton, 42 Edinburgh Crescent, Renyella, South Australia (AU) 5161; Paulus Boon, 24 Felix Crescent, Morphett Vale, South Australia (AU) 5162

( * ) Notice: Subject to any disclaimer, the term of this patent is extended or adjusted under 35 U.S.C. 154(b) by 0 days.

(21) Appl. No.: 10/490,113

(22) PCT Filed: Sep. 27, 2002

(86) PCT No.: PCT/AU02/01323

§ 371 (c)(1),
(2), (4) Date: Mar. 26, 2004

(87) PCT Pub. No.: WO03/027477

PCT Pub. Date: Apr. 3, 2003

(65) Prior Publication Data
US 2004/0187851 A1    Sep. 30, 2004

(30) Foreign Application Priority Data
Sep. 27, 2001   (AU) .................................. PR7944
Nov. 20, 2001   (AU) .................................. PR8939

(51) Int. Cl.
F02B 43/00    (2006.01)
(52) U.S. Cl. ........................ 123/527; 123/557
(58) Field of Classification Search ............. 123/527, 123/557
See application file for complete search history.

(56) References Cited

U.S. PATENT DOCUMENTS 4,180,036 A    12/1979   Wolf (Continued)

FOREIGN PATENT DOCUMENTS

DE              2362466          6/1975

(Continued)

OTHER PUBLICATIONS

Derwent Abstract Accession No.: 2002-265597/31Class Q53;X22, RU2179258 C2 (Vyatsk Agric Acad) Feb. 10, 2002.

(Continued)

Primary Examiner—Tony M. Argenbright
Assistant Examiner—Katrina Harris
(74) Attorney, Agent, or Firm—O. M. (Sam) Zaghmout; Bio Intellectual Property Services (BioIPS) L.L.C.

(57) ABSTRACT

A system for controlling the temperature of gaseous fuel for a coolant cooled engine having a liquid to gas converter where the coolant is adapted to heat the converter. The system includes a gas temperature sensor adapted to measure the temperature of gas exiting the converter and a valve means adapted to regulate the flow of coolant into the converter. A control means determined when said gas temperature falls below a pre-determined value and opens the valve to cause an increased flow of coolant into the converter thus heating it. The system further includes an embodiment where the control means causes the valve means to close only when the temperature of gas exiting the converter is greater than a pre-determined value. A coolant temperature sensor also ensures that the valve can not be completely closed off unless the coolant temperature is above a pre-set value such as 50 degrees Centigrade.

17 Claims, 3 Drawing Sheets

U.S. PATENT DOCUMENTS

| | | | |
|---|---|---|---|
| 4,323,026 A | 4/1982 | Gallagher | |
| 4,524,747 A | 6/1985 | Van Den Wildenberg | |
| 5,379,742 A | 1/1995 | Breland | |
| 5,483,943 A | 1/1996 | Peters | |
| 5,666,929 A * | 9/1997 | Knowlton et al. | 123/546 |
| 5,727,384 A * | 3/1998 | Ma | 60/284 |
| 5,850,822 A | 12/1998 | Romann | |
| 6,662,788 B1 * | 12/2003 | Nist | 123/525 |

FOREIGN PATENT DOCUMENTS

| | | |
|---|---|---|
| GB | 2088475 | 6/1982 |
| JP | 8144861 | 6/1996 |
| WO | WO0004288 | 1/2000 |

OTHER PUBLICATIONS

Derwent Abstract Accession No.: 96-320125/32,Class Q53,JP 08144861 A (Honda Motor Co Ltd) Jun. 4, 1996.

* cited by examiner

APPARATUS AND METHOD FOR CONTROLLING THE TEMPERATURE OF THE LIQUID PETROLEUM GAS (LPG) FUEL

This application is a 371 of PCT/AU02/01323 filed Sep. 27, 2002, now WO 03/027477, the contents of which are incorporated herein by reference.

BACKGROUND OF THE INVENTION

The present invention relates to an apparatus and method for controlling the temperature of LPG (Liquid Petroleum Gas) fuel and in particular for not only cooling the fuel but also keeping it at a relatively constant cool temperature before it enters the combustion chamber of an engine.

Liquid gas, such as LPG, is a common fuel used in many internal combustion engines. The LPG is for reasons of practicability stored in its liquid state. To use LPG as a fuel for internal combustion engines hence requires conversion from the liquid to the gas state. This is accomplished in a liquid to gas converter that is well known in the art.

However, the conversion step from a liquid phase to a gas phase creates a refrigerative effect, which, if left unheated, will cause the converter to freeze. This in turn causes the regulator jet in the converter to block preventing supply of fuel to the engine. The degree of cooling obviously increases with greater flows of gas such as when the engine is under load or accelerating.

Current solutions to this problem include heating the converter. Typically the heat is provided from the cooling means of the engine, such as the engine radiator, where hot coolant is piped from the engine to then pass through the converter. This has been successfully used for a number of years and creates a hot gaseous fuel for the engine. The temperature of the heated gaseous fuel can be in the range of 40° C. to 90° C. or higher, depending on coolant temperature and the rate of gas conversion.

One of the difficulties of heating the converter in this way is that the fuel is relatively "hot". It has been found that high temperature fuels can cause a loss of power and an increase in fuel consumption due to inefficient burning of the fuel. The air/fuel mix is less dense at higher temperatures and less mixture enters the cylinders producing less power and less efficient burning of the mixture.

A further difficulty with a hot mixture is unstable firing of the fuel in the engine cylinders.

In addition, large fluctuations in fuel density cause a corresponding change in the air/fuel ratio causing either a lean or rich mix depending on the combination of conditions.

Devices that cool the air before it is injected into the combustion chamber are known. These however are generally large and limited in application and do not represent a commercially viable option.

Yet other devices attempt to cool the fuel/air mixture before injection. These are usually an integral part of the converter. Typically they utilise a mechanical thermostat for coolant flow control wherein the thermostat reduces the flow of coolant when at a certain temperature. They however only measure the coolant temperature. The gas temperature is not measured and it is only assumed that it is at a more effective operating temperature. However, varying gas flows will vary the gas temperature greatly due to excessive thermal lag in changes in gas temperature reaching the thermostat that is embedded in the coolant in the heating chamber. These devices can also not be retrofitted to existing engines and converters.

Accordingly none of the prior art devices teach one that by controlling the gas temperature better fuel performance can be gained. In fact, most of them teach operating temperatures that are relatively high, and well above those at which performance improves.

It is an object of the present invention to propose an apparatus that overcomes at least some of the abovementioned problems or provides the public with a useful alternative.

It is a further object of the present invention to provide an apparatus that enables the operation of the converter at a significantly lower temperature. This provides a low temperature fuel to the engine's carburettor, thus cooling the fuel/air mixture. Running an engine on a cooler fuel/air mixture provides an increase in power and a greater efficiency in fuel use, therefore greater economy. It also aids in reducing knock and detonation in the engine and creates an improved burn of the mix. Further, by maintaining the temperature in a narrower band there is less variation in the fuel mix.

This is achieved by utilising the refrigerative effect of the conversion of liquid gas fuel, combined with controlling the gas temperature and heating of the converter, to take advantage of the properties of a low temperature fuel/air mix.

In its most basic form the invention utilises a module for the provision of low temperature gaseous fuel to a liquid cooled internal combustion engine by closed loop control of the converter temperature. A module also controls the amount of hot coolant from the engine cooling system flowing through the liquid gas converter in order to operate the converter at lower than coolant temperatures.

SUMMARY OF THE INVENTION

Therefore in one form of the invention there is proposed a system for controlling the temperature of gaseous fuel for an engine having a liquid to gaseous fuel converter including:

a heater means adapted to heat the converter to thereby assist in converting the fuel from liquid to gas;

a first temperature sensor adapted to measure the temperature of the converted gaseous fuel and provide an output indicative of said gaseous fuel temperature;

a second temperature sensor adapted to measure the temperature of the converter and provide an output indicative of said converter temperature;

a control means adapted to receive said measured gaseous fuel temperature and operate said heater to heat the converter if said measured gaseous fuel temperature falls below a pre-determined first threshold and turn said heater off if said measured gaseous fuel temperature rises above a pre-determined second threshold, said control means further adapted to receive said measured converter temperature.

Alternatively, one cold equally well measure the temperature of the heater means or heating medium used to heat the converter thereby providing an indirect measurement of the converter temperature. The fact that the control means turns off the heater if the measured gaseous fuel temperature rises above a pre-determined threshold ensures that the fuel is cool providing the advantages of greater economy and power.

Preferably the control means will operate said heater to turn it off only if said measured converter temperature is above a pre-determined value.

Preferably said predetermined first threshold is approximately 4 degrees Centigrade. Advantageously, the control means begins to operate once the temperature falls below about 10 to 12 degrees Centigrade, and the 4 degrees is the temperature at which the heating is at a maximum.

Preferably said pre-determined second threshold is approximately 6 degrees Centigrade.

In preference said converter temperature value is approximately 5 degrees Centigrade. However, the converter may be subject to a heating that is considerably higher than this but due to the conversion operates at a much lower temperature. Thus for example, if using a car coolant, the coolant may be some 50 degrees or more but the converter will still be around 5 degrees. The value that is measured then depends on what exactly is being measured. If it is the coolant the value may be 50 degrees indeed whilst if measuring the converter itself the value may be only 5 degrees.

Advantageously the heater means is the coolant used to cool an engine of the type having a fluid coolant.

Advantageously the second temperature sensor measures the temperature of the coolant before it enters said converter.

In preference the control means calculates the rate of change of said second temperature sensor to control the heating.

Preferably said first and second pre-determined thresholds are variably controlled by an operator of said engine.

In a further form of the invention there is proposed a system for controlling the temperature of gaseous fuel for a coolant cooled engine having a liquid to gas converter the coolant adapted to heat said converter, said system including:

a gas temperature sensor adapted to measure the temperature of gas exiting the converter;

a coolant temperature sensor;

a valve means adapted to regulate the flow of coolant into the converter;

a control means wherein when said gas temperature falls below a first pre-determined threshold, the control means causes the valve means to open to cause an increased flow of coolant into the converter thus heating it, and when said gas temperature rises above a second pre-determined threshold causes the valve means to close, said control means further adapted to close the valve when the temperature of the coolant temperature sensor is above a pre-determined value.

In preference said sensor is positioned to measure the temperature of the coolant entering said converter.

In preference said valve means includes a servo motor coupled to a rotational valve.

In preference the valve means includes a servo motor mechanically linked to a slidable valve.

Typically the valve is prevented from closing off completely when the temperature of the coolant is below a pre-set value, such as 50 degrees Centigrade.

Typically the lower the coolant temperature the more is the valve held open. This is to prevent icing of the converter when the coolant is not hot enough to allow complete restriction of the coolant. Control of the gas temperature is still maintained by varying the valve over the range still available but the minimum aperture is varied by coolant temperature up to the pre-determined value, above which the valve will be able to close off completely when required.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
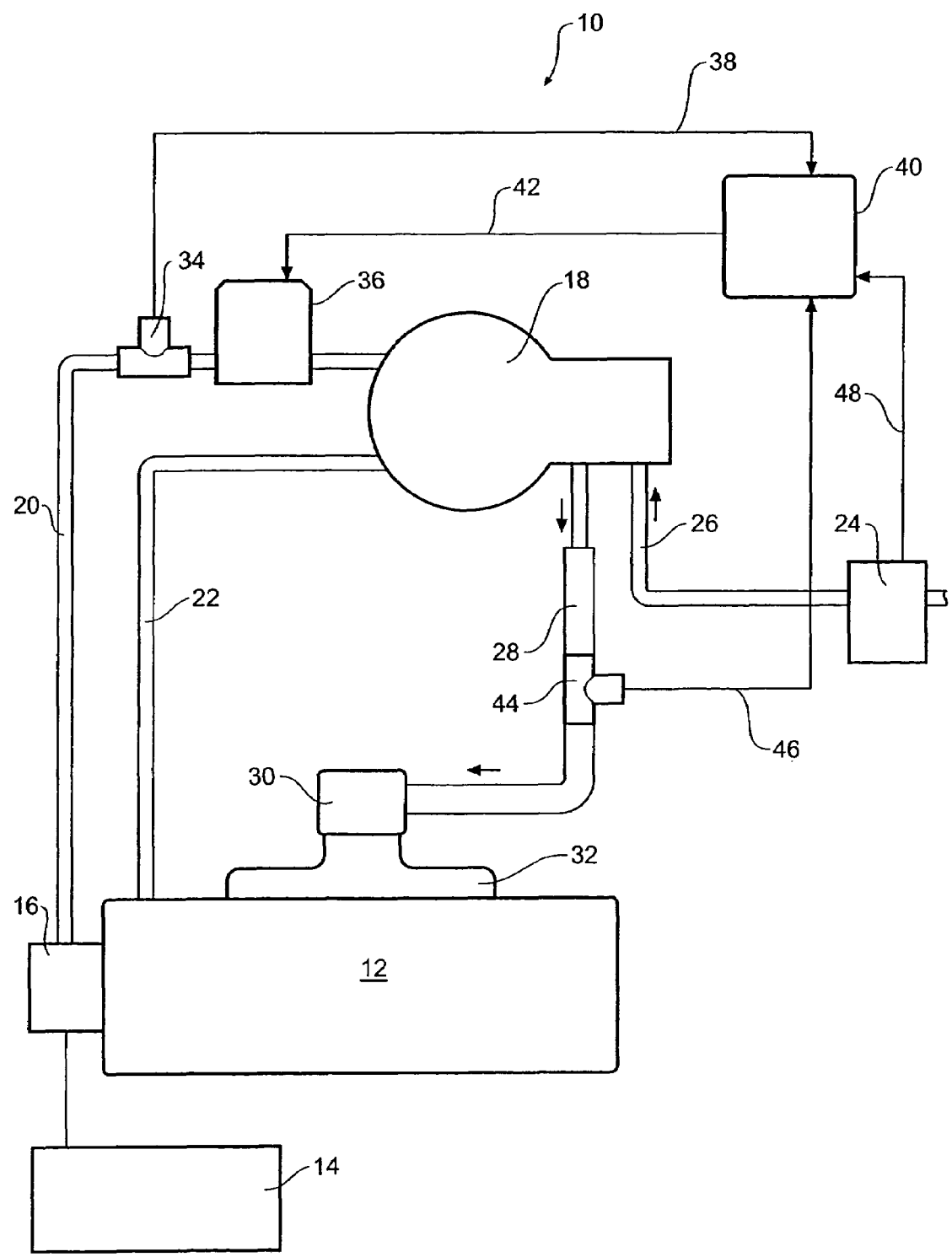
FIG. 1 is a schematic illustration of a cooling system embodying the present invention.

Referring now to FIG. 1, there is illustrated a schematic illustration of the LPG converter temperature control system 10 embodying the present invention. The system 10 includes an internal combustion engine 12 cooled by a liquid coolant system comprising a radiator 14 to vent excess heat to the atmosphere and a coolant pump 16 that provides a positive pressure to move the coolant through the cooling system and the engine and other peripheral devices such as cabin heaters (not shown).

In a typical LPG installation a gaseous fuel converter 18 includes inlet and outlet coolant hoses or pipes 20 and 22 that allow coolant to flow between the engine 12 and the converter 18. Once the coolant temperature is generally above 50° C. there is sufficient heat energy provided to the converter 18 to control the gaseous fuel temperature.

Fuel control solenoid 24 is connected to a typical storage unit such as a tank (not shown). LPG is fed from the fuel control solenoid 24 into the converter 18 through inlet pipe 26, the converter vaporising the gas, the vaporised gas then fed through pipe 28 to the engine carburettor 30 that then distributes the fuel through the engine manifold 32 into the engine 12.

Coolant temperature sensor 34 is located in the coolant inlet hose 20 with a servo assembly 36 located between the sensor 34 and the converter 18 and adapted to control the volume of coolant entering the converter. Thus the coolant temperature sensor 34 measures the temperature of the coolant entering the converter 18, and provides this information as data 38, typically via an electrical cable, to an electronic control unit (ECU) 40 that electronically controls the operation of the servo assembly 36 by providing a signal 42, typically through an electrical connection or cable.

A vapour gas temperature sensor 44 is located in the gas outlet pipe 28 and measures the temperature of the vaporised gas providing this information to ECU 40 as data 46, typically through an electrical cable. Electrical power 48 is provided to the ECU 40 through the fuel control solenoid 24 for safety reasons so that if the engine 12 is not being fuelled, the ECU 40 is also turned off.

The skilled addressee should now appreciate that the ECU 40 controls the servo assembly 36 through cable 42 to increase or decrease the amount of coolant entering the converter 18, thereby ensuring that the vaporised gas 28 is not too hot or too cold.

Figure 2:
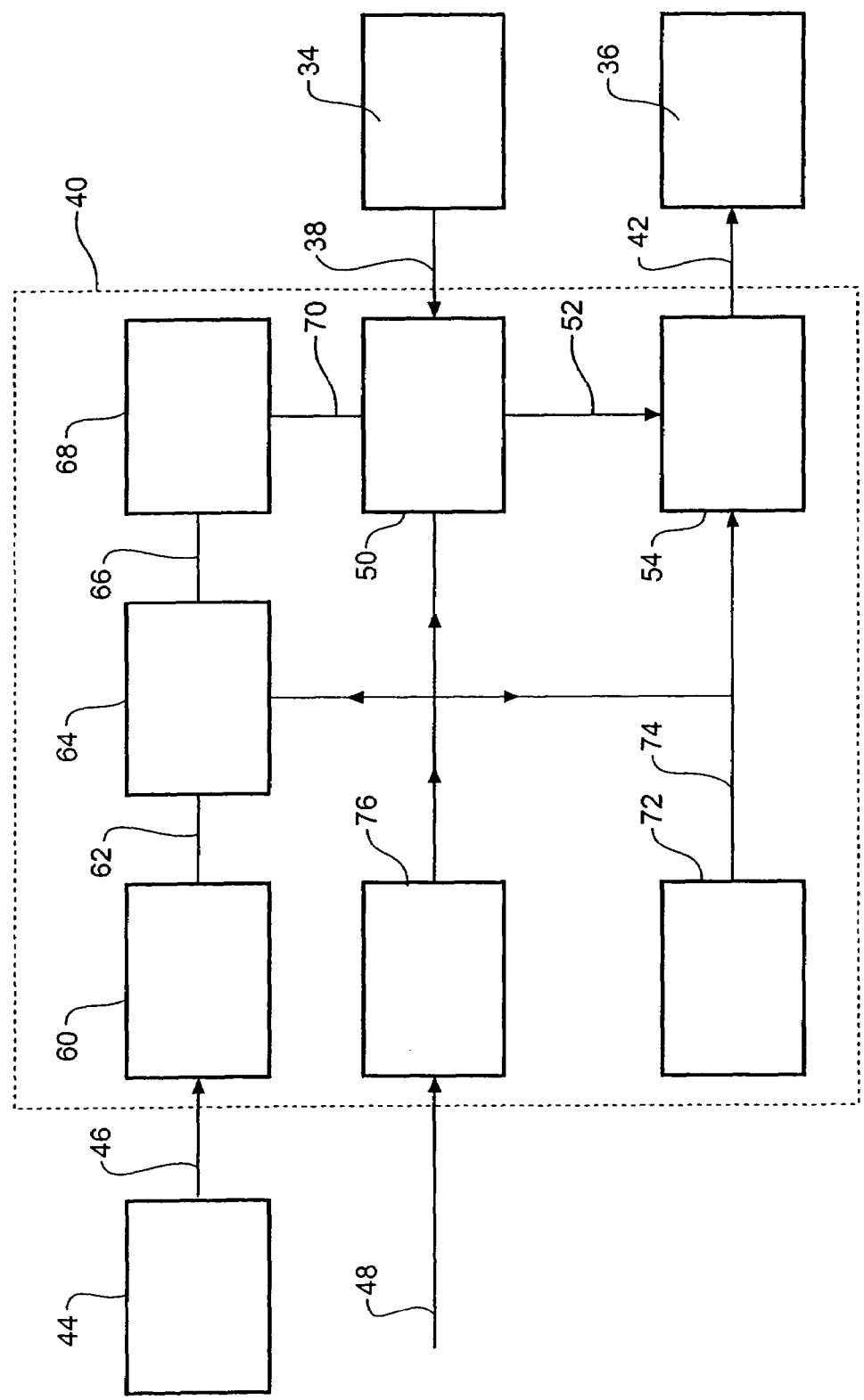
FIG. 2 is a schematic illustration of the block diagram of the electronic controller used in the present invention.

The logic behind the electronic control unit 40 is illustrated in FIG. 2. Coolant temperature data 38 is fed into the ECU 40. The ECU 40 determines if the coolant temperature is above a pre-determined threshold value by use of a coolant low-temperature detection circuit 50. This circuit provides a signal 52 to the Pulse Width Modulation (PWM) servo control circuit 54 which sends signal 42 to the servo assembly 36 comprising a servo motor 56 that operates valve 58 typically variably between an open and closed position (see FIGS. 3 and 4, discussed in further detail below).

When the engine 12 is cold or its temperature (and hence the coolant) under a pre-set value, typically some 50° C., the servo motor 56 operates the valve 58 to its open position. This allows coolant to flow from the engine 12 through the inlet hose 20 to the converter 18.

In the simplest form of operation the valve 58 is in the open position and the coolant temperature sensor 34 only provides signal 38 to the ECU 40 when the temperature is above a pre-set value, such as 50° C. This is the normal or "sleep" mode of the system 10 in that the valve 58 is in the open position allowing coolant to flow through the converter 18.

However, in a preferred embodiment that is discussed further on in more detail, the coolant flow is variably controlled thus controlling the vapour temperature below a coolant temperature of 50 degrees Centigrade, the valve prevented from completely closing depending on the temperature if the coolant. Typically if the coolant is near 50 degrees Centigrade the valve is nearly completely closed, around some 20 degrees Centigrade the valve is held slightly open even though it would normally be closed based upon the gas temperature.

Those skilled in the art will however readily appreciate that the signal could in fact be a variable one and provide information as to the actual temperature that is then suitably processed by the ECU 40. The following description however assumes that ECU 40 only receives signal 38 when the coolant temperature is above 50° C. This overcomes the problem that occurs when the engine 12 and the coolant are both cold or at the ambient temperature. When, for example, the ambient temperature is around 25° C., and the controller's set temperature of operation is around 5° C., the controller attempts to shut of the coolant flow as the gas temperature is too high at ambient and the converter 18 then freezes until the coolant heats up. For that reason the signal 38 is not provided to the ECU 40 until the coolant reaches a temperature of some 50° C.

Those skilled in the art will also appreciate that one can alternatively provide normal control of gas temperature when the engine and coolant are under 50° C. using the signal from the coolant sensor 34 with signal 38 always fed to the ECU 40. Within ECU 40, the coolant low temperature detection circuit 50 either blocks or overrides signal 38 and forces the servo valve 58 to open.

While the coolant is at a low temperature it is only just capable of keeping the converter 18 from freezing. Freezing is where the temperature within the converter 18 is sufficiently low that the liquid gas does not fully convert to vaporised gas thus restricting or blocking the regulator jet and causing a drop or loss of fuel respectively in mild cases and causing the coolant in the converter to freeze thus potentially damaging the converter. To attempt to control the temperature within this range will occasionally result in a sufficient drop in temperature to freeze the converter 18 when gas demand is high. Once the engine 12 has heated the coolant to above 50° C. the coolant low temperature detection circuit 50 releases control of the PWM servo control circuit 54 allowing normal operation as explained below.

When the engine 12 has heated the coolant to above 50° C., the ECU 40 is deigned to accept and use signal 46 from the liquefied gas temperature sensor 44. This signal 46 is passed through an input conditioning circuit 60 where it is filtered and added to the integration of itself. The integration of the input signal 46 of the gas temperature is added to itself to overcome the problems of any delays in shutting off the coolant. For example, the shut off could be slow due to thermal lag between the input of coolant and the warming of the gas due to the mass of the converter. The integration step acts to provide a pulse increase in the processing of the signal to ultimately limit the amount of hot coolant entering the converter. The response is then proportional to the rate of change of the gas temperature rather than the absolute measurement.

The output 62 of the input conditioning circuit 60 is input into an amplifier and offset circuit 64 where signal 62 is amplified and an offset is added. The offset is variable and is used to determine the nominal operating temperature of the system. This allows for different operating environments where ambient temperatures may vary enough to effect the operation of the converter. A simple adjustment may be provided for users and installers to set said offset.

The output signal 66 from the amplifier and offset circuit 64 is input to a voltage limit circuit 68 where the signal 66 is restricted to the range of voltages that are required by the PWM servo control circuit 54. This is to prevent the servo motor 56 from being driven hard against its end travel points where damage may occur. The signal output 70 from the voltage limit circuit 68 is fed via the previously described coolant low temperature detection circuit 50 to the PWM servo control circuit 54 where it is converted to a PWM signal 42 suitable for the servo motor assembly 36. An internal oscillator 72 provides timing 74 to the PWM 54. Power is supplied via a power supply 76 that, as discussed above, is in itself provided power 48 from fuel control solenoid 24.

ECU 40 processes the gaseous fuel temperature that is measured by the gas temperature sensor 44 such that as the temperature of the gas rises, the servo valve 58 will be proportionately closed thus reducing the heating effect of the coolant on the gas. The gas will be maintained within a temperature range determined by the thermal lag of the mass of the coolant and the mass of the converter 18, as well as the rate of gas conversion that sets the rate of cooling. The temperature of the gas is held nominally at a range of some 4°–6° C. as the heating of the gas, as it passes through the converter 18, before reaching the gas temperature sensor 44 will create a temperature gradient where by the jet of the converter 18 will be at some temperature below that at the gas measuring point. Therefore the gas temperature sensor 44 needs to be placed as close as possible on the gas outlet hose 28 to the converter 18 to minimise said gradient.

The cooled gaseous fuel is fed to the engine carburettor 30 where it mixes with the incoming air (not shown) creating an overall cooled air/fuel mix that enables greater fuel economy and power output as described above.

Those skilled in the art will appreciate that the present invention has an advantage over known prior art systems in that the temperature of the gaseous fuel is measured in order to control the application of heating from the engine's coolant. Acting on the temperature of the coolant in the converter 18 alone does not allow for the enormous temperature changes that occur when the gas conversion rate varies, nor does it allow for the thermal lags inherent in the mass of the converter 18 and coolant that translates into greater gas temperature variations.

In trials it has been found that the temperature control range is typically around or less than 1° C. when operating on a constant conversion rate and approximately some 5° C. under varying loads.

The system 10 consumes very little electrical power, typically less than 0.5 Amperes at 12 Volts DC, including the operation of the servo valve assembly 36. The power input is typically reverse polarity protected and produces regulated voltages for the ECU 40 circuits. The 12V DC power 48 is derived from the voltage applied to existing fuel control solenoid 24 that enables the supply of liquid gas fuel to the converter 18 through inlet pipe 26.

Figure 3:
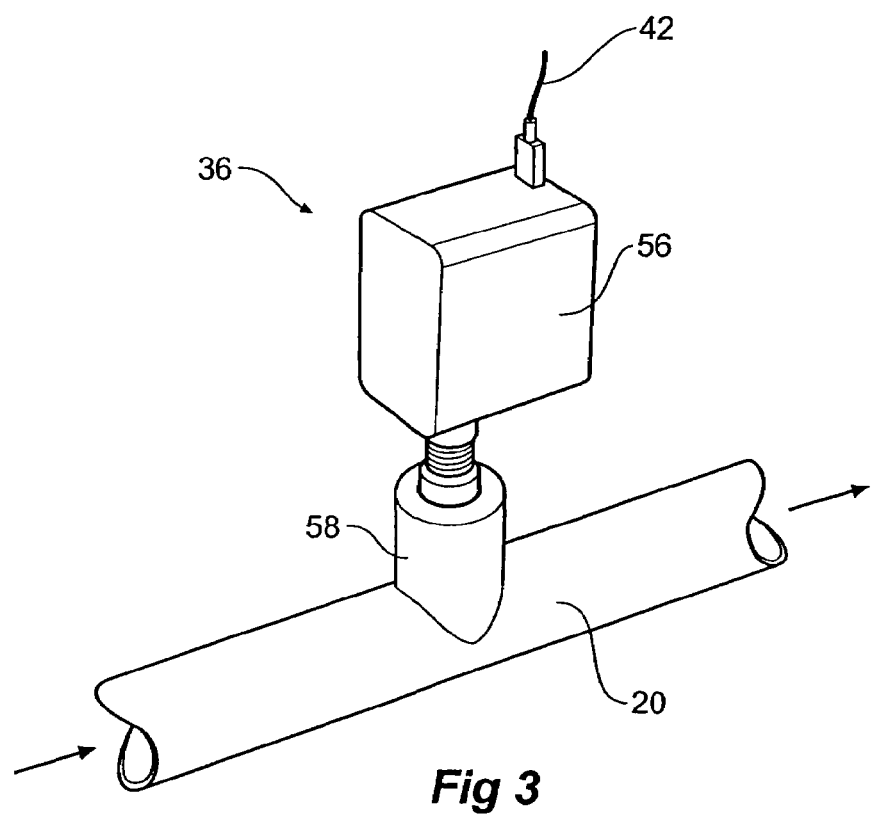
FIG. 3 is a schematic drawing of the servo valve assembly.
Figure 4:
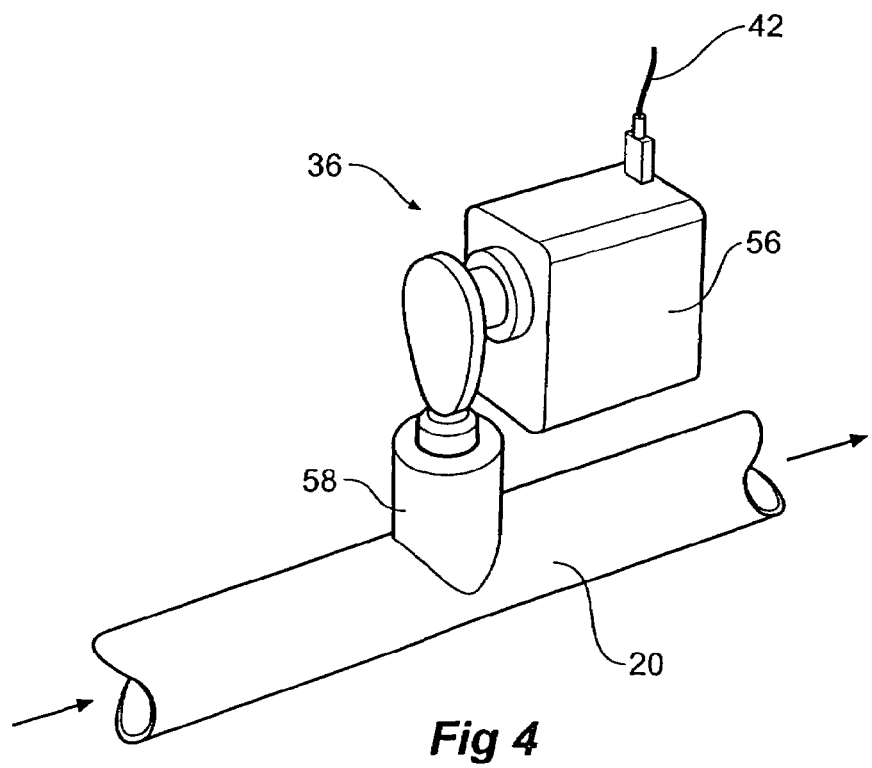
FIG. 4 is a schematic drawing of an alternate servo valve assembly.

FIG. 3 illustrates a servo unit employing a rotational type valve that can rotate through a range of some 90 degrees. In an alternate configuration, illustrated in FIG. 4, the valve may be a slidable valve operated through a cam or linkage by servo motor 56.

Accordingly one can appreciate that the present invention provides for a module for the provision of low temperature gaseous fuel to a liquid cooled internal combustion engine by closed loop control of the converter temperature. A module also controls the amount of hot coolant from the engine cooling system flowing through the liquid gas converter in order to operate the converter at lower than coolant temperatures.

A sensor module in the gas outlet pipe from the converter to the carburettor measures the fuel temperature. An electronic control unit using either analogue or micro controller technology processes the signal from this sensor.

The output from this electronic control unit controls the servo valve position, which varies the coolant flow rate. Less flow allows a cooler converter temperature and therefore a lower gas temperature as the amount of heat energy delivered by the coolant becomes approximately equal to the amount of cooling from the gas conversion process. When gas demand from the engine rises the conversion process creates a greater amount of cooled gas. The gas temperature will drop as the coolant heat energy is taken up. This temperature drop is detected and the valve is opened proportionately, allowing a greater coolant flow that provides more heat energy to heat the gas up to the set temperature. Conversely, as less gas is required the cooling effect reduces which increases gas temperature. The valve will be proportionately closed thus reducing the transfer of heat to the gas, maintaining a low gas temperature.

An operating temperature of approximately 4° C. is preferred as this allows for a drop in gas temperature of about 5° C. before the boiling temperature of butane, −1° C., is reached. Below this temperature butane will not convert and may interfere with the correct delivery of fuel to the engine. As the gas is measured a short distance away from the conversion jet in the converter there is a temperature differential. Setting a higher measuring point temperature maintains the jet at a temperature above butane's boiling point. It is not commercially viable to dismantle the converter to place the sensor on the jet. It has been found that the best performance is achieved at a temperature at or below 12° C. at the measuring point of the gas temperature in the current embodiment.

Although there are issues in relation to the path of travel of the gas through conduits and its exposure to local heat sources, these are not discussed in any further detail. Those skilled in the art will readily appreciate the issues and will be able to ensure the right configuration of the gas pipes to ensure the minimum amount of external effect on the gas within the pipes.

In operation a sensor module that is mounted on the coolant feed pipe. This is generally mounted to the pipe next to the variable inlet valve housed within the module. The sensor detects when the coolant temperature is high enough to allow control of coolant flow. When the engine is started from cold the converter is initially at ambient temperature. The full flow of coolant at ambient is sufficient to prevent freezing so the control must not restrict flow until the coolant begins to rise in temperature. Restricting the coolant flow while its temperature is low will allow the converter to reach very low temperatures and may freeze and ice up the jet. The controller holds the servo valve open until the coolant reaches a preset temperature, approximately +50° C. When this temperature is reached the servo valve control will then be determined by the gas temperature.

The preferred embodiment is a low cost and simple to install module and may be fitted to existing gas conversion units as well as during new installations of converters. Other cooling systems have required the purchase of a specific brand of converter, or alternatively expensive and complex systems. None of the current converters have taught the principle of operating with cool fuels.

The present system overcomes the problems of running the converter with a smaller flow through of coolant. This always runs the risk of the system freezing when a power boost is required. It also overcomes the problems of using a purely mechanical thermostatic valve that has been found to be affected by the heat within the engine bay area and to be relatively slow in its response time.

Those skilled in the art will now appreciate that an advantage of the present invention is that the temperature of the gaseous fuel entering an engine may be maintained at an optimum performance temperature. A further advantage of the present invention is that it may be fitted to any gas converter relying on, but not limited to, engine coolant to heat the converter. Furthermore the present invention is not limited to the use of liquefied petroleum gas (LPG) and may apply to other fuel systems where temperature control of a converter is required.

Although the above description referred to use of the engines coolant to heat the converter it is to be understood that the method of heating is not intended to be limited to use of the engine coolant. For example, an electric heating element may equally well be employed to heat the converter. The use of the engine coolant is thus shown by way of example only.

The above description described the operation of the ECU using a standard analog circuit. However it is to be understood that control of the system may equally well be accomplished using a micro-controller as is well known in the art.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A system for controlling the temperature of gaseous fuel for an engine having a liquid to gaseous fuel converter including:
    a heater means adapted to heat the converter to thereby assist in converting the fuel from liquid to gas;
    a first temperature sensor adapted to measure the temperature of the converted gaseous fuel and provide an output indicative of said gaseous fuel temperature;
    a second temperature sensor adapted to measure the temperature of the converter and provide an output indicative of said converter temperature;
    a control means adapted to receive said measured gaseous fuel temperature and operate said heater to heat the converter if said measured gaseous fuel temperature falls below a pre-determined first threshold and turn said heater off if said measured gaseous fuel temperature rises above a pre-determined second threshold, said control means further adapted to receive said measured converter temperature.

2. A system as in claim 1 wherein said control means will operate said heater to turn it off only if said measured converter temperature is above a pre-determined value.

3. A system as in claim 1 wherein said pre-determined first threshold is approximately 4 degrees Centigrade.

4. A system as in claim 1 wherein said pre-determined second threshold is approximately 6 degrees Centigrade.

5. A system as in claim 2 wherein said converter temperature pre-determined value is approximately 5 degrees Centigrade.

6. A system as in claim 1 wherein said heater means is the coolant used to cool an engine of the type having a fluid coolant.

7. A system as claim 1 wherein said second temperature sensor measures the temperature of the coolant before it enters said converter.

8. A system as in claim 1 wherein said control means calculates the rate of change of said second temperature sensor to control the heating.

9. A system as in claim 1 wherein said first and second pre-determined thresholds are variably controlled by an operator of said engine.

10. A system for controlling the temperature of gaseous fuel for a coolant cooled engine having a liquid to gas converter the coolant adapted to heat said converter, said system including:
    a gas temperature sensor adapted to measure the temperature of gas exiting the converter;
    a coolant temperature sensor;
    a valve means adapted to regulate the flow of coolant into the converter;
    a control means wherein when said gas temperature falls below a first pre-determined threshold, the control means causes the valve means to open to cause an increased flow of coolant into the converter thus heating it, and when said gas temperature rises above a second pre-determined threshold causes the valve means to close, said control means further adapted to close the valve when the temperature of the coolant temperature sensor is above a pre-determined value.

11. A system as in claim 10 wherein said coolant temperature sensor is positioned to measure the temperature of the coolant entering said converter.

12. A system as in claim 10 wherein said valve means includes a servo motor coupled to a rotational valve.

13. A system as in claim 10 wherein said valve means includes a servo motor mechanically linked to a slidable valve.

14. A system for controlling the temperature of gaseous fuel for a coolant cooled engine having a liquid to gas converter the coolant adapted to heat said converter, said system including:
    a gas temperature sensor adapted to measure the temperature of gas exiting the converter; a coolant temperature sensor; a valve means adapted to regulate the flow of the coolant into the converter; a control means adapted to keep the valve open when the temperature of the coolant is below a predetermined value regardless of the temperature of the gas; wherein when said coolant temperature is above said predetermined value and the gas temperature falls below a first predetermined threshold, the control means causes the valve means to open to cause an increased flow of the coolant into the converter thus heating it, and when said gas temperature rises above a second pre-determined threshold causes the valve means to close to reduce or stop the flow of the coolant into the converter.

15. The system of claim 14 wherein the predetermined temperature, of the coolant at which the valve means regulates the flow of the coolant as controlled by the gas temperature, is approximately 50° C.

16. The system of claim 14 wherein the predetermined gas temperature below which the valve means is caused to open is approximately 4° C.

17. The system of claim 14 wherein the predetermined gas temperature, above which the valve means is caused to close or reduce the flow of coolant, is approximately 6° C.

* * * * *